March 18, 1941.  R. E. BRADLEY  2,235,277
ATTACHMENT FOR SWEEPERS AND THE LIKE
Filed July 13, 1938  2 Sheets-Sheet 1
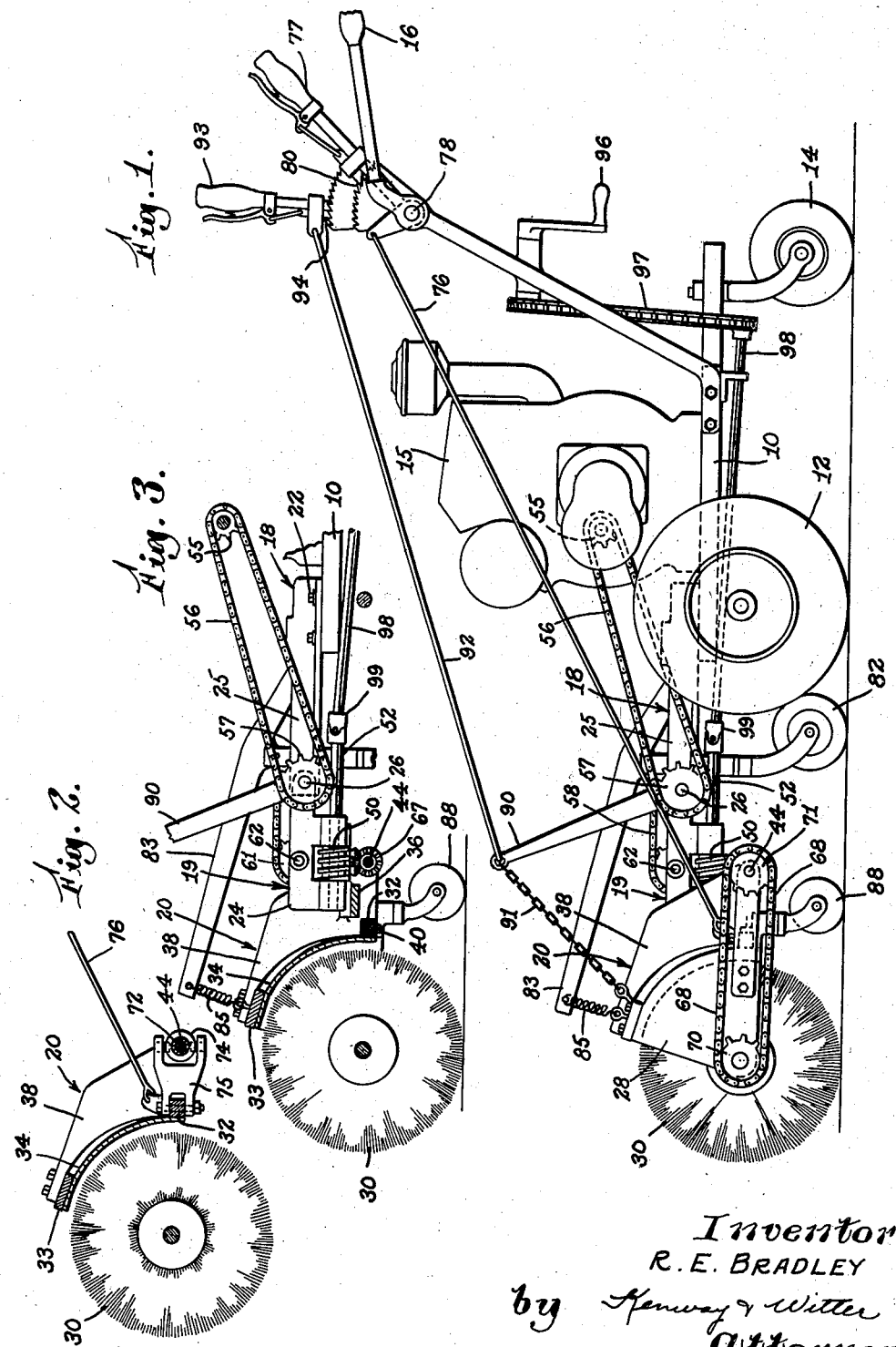
Inventor
R. E. BRADLEY
by Kenway & Witter
Attorneys March 18, 1941. R. E. BRADLEY 2,235,277
ATTACHMENT FOR SWEEPERS AND THE LIKE
Filed July 13, 1938 2 Sheets-Sheet 2
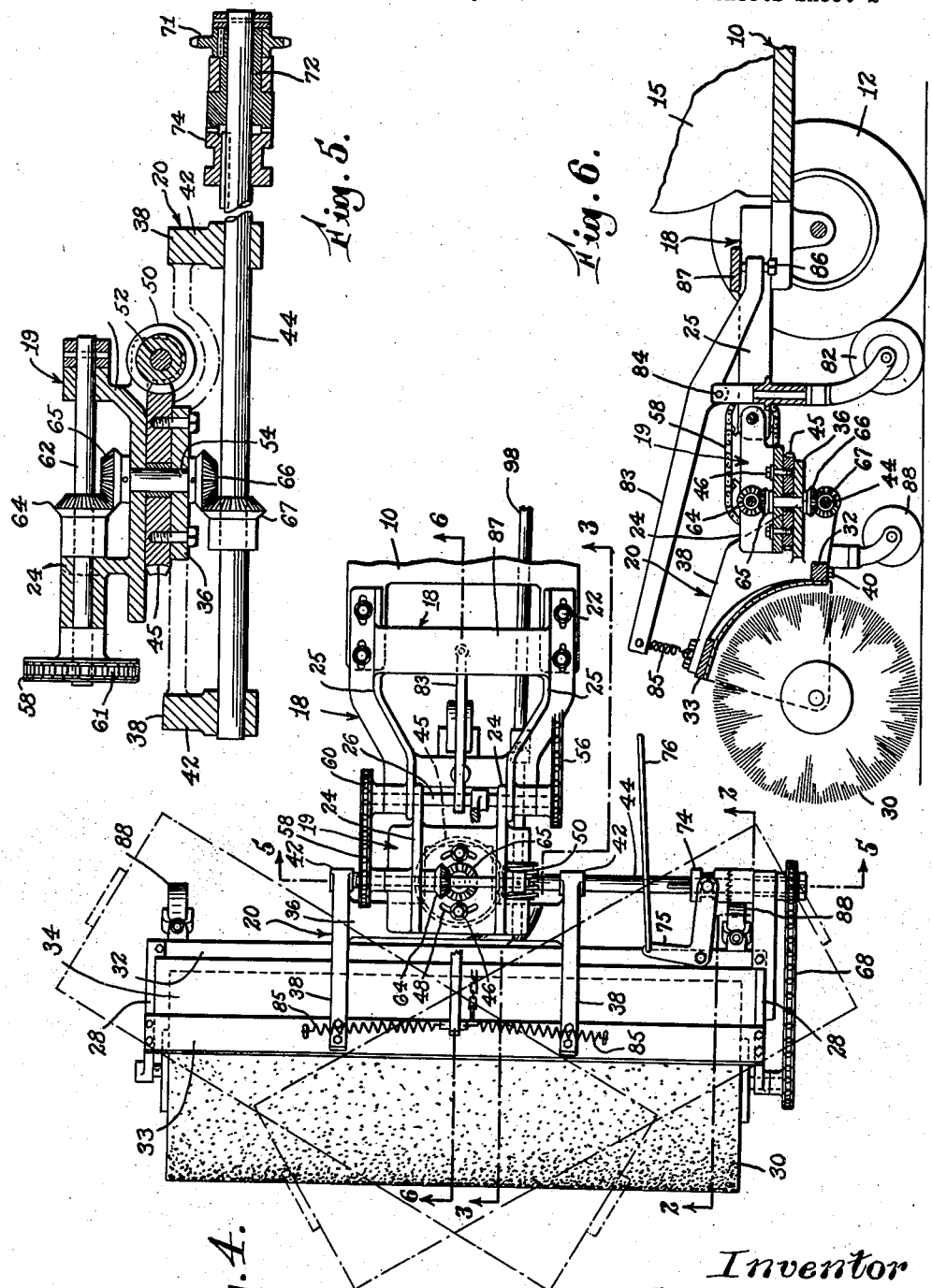
Inventor
R. E. BRADLEY
by Kenway & Witter
Attorneys Patented Mar. 18, 1941

2,235,277

UNITED STATES PATENT OFFICE 2,235,277

ATTACHMENT FOR SWEEPERS AND THE LIKE

Robert E. Bradley, Quincy, Mass.

Application July 13, 1938, Serial No. 218,980

6 Claims. (Cl. 15—82)

This invention relates to attachments for power operated sweepers and the like and the primary object of the invention is to produce an improved and more compact attachment unit which will be applicable to a wide variety of jobs such as sweeping, grass cutting, snow plowing, etc. I am aware that various such attachments are known and in use, these including the straight brush type, the angle brush type and the adjustable brush type. The attachment comprising my invention is of the adjustable type and is so constructed as to serve the uses of all said types.

The improved sweeper which I have herein illustrated and described is preferably in the form of an attachment adapted for use on power operated tractors, and especially on hand-guided tractors, and is so constructed that it may be applied thereto with a minimum of time and expense and without requiring any substantial modification of the tractor. The attachment is a unit having a rotary brush at its forward end and having its rear portion arranged to be bolted to the forward end of the tractor. In its preferred form, the unit embodies a plurality of frames including a brush supporting frame and a frame to be rigidly secured to the tractor. Intermediate of the brush and tractor are provided compact connections and gearing for permitting vertical movement of the brush and angular adjustment thereof in a horizontal plane to different working positions. Also cooperating with the unit are novel brush counter-balancing means and means including a traversing caster and cooperating mechanism for raising the brush and placing its weight on the caster for traveling purposes. A further object of the invention resides in providing a compact and rugged attachment embodying these features and connections for affecting the various adjustments and movements with great convenience from the operator's position and without requiring any substantial alteration of the tractor.

These and other features of the invention will be best understood and appreciated from the following description of a preferred embodiment thereof, selected for purposes of illustration and shown in the accompanying drawings in which, Fig. 1 is a side elevation of my improved sweeper attachment applied to a hand guided and power operated tractor.

Fig. 2 is a fragmentary sectional view taken on line 2—2 of Fig. 4.

Fig. 3 is a fragmentary sectional view taken on line 3—3 of Fig. 4.

Fig. 4 is a plan view of the attachment.

Fig. 5 is an enlarged fragmentary sectional view taken on line 5—5 of Fig. 4.

Fig. 6 is a fragmentary view taken on line 6—6 of Fig. 4.

Rotary sweepers are most commonly constructed in the form of independent units to be attached to power operated tractors already known and in use, since such construction is more convenient and more economical than building the sweeper as a part of the tractor and, while I have in this application illustrated, described and claimed my improved sweeper in the form of an attachment to be thus applied, it will be understood that the invention resides in the novel mechanism herein disclosed and not in the method of its application to the power unit.

In the accompanying drawings I have illustrated my improved sweeper attachment as applied to a power operated tractor of the hand guided type and which may be termed a two-wheel tractor since the main load is supported on two wheels in axial alignment and which serve as the driving wheels. This tractor comprises a frame or body 10 mounted on a pair of tractor wheels 12 and a rear caster 14. The tractor is adapted to have an attachment secured to the front thereof which substantially counterbalances the weight of the engine and places the major weight of the apparatus quite substantially on the two wheels 12. The tractor is driven by an engine 15 and manually guided from a pair of handles 16.

My sweeper attachment, as illustrated, embodies three frames 18, 19 and 20. The frame 18 is constructed to be bolted directly and rigidly to the forward end of the tractor frame 10 at 22 and project forward horizontally therefrom. The frame 19 embodies a flat horizontal plate and two parallel and vertical plates 24 integral therewith and extending rearwardly therefrom. The rear ends of these plates are located between and in engagement with two like vertical plates 25 integral with the frame 18, and a shaft 26 passing through these plates serves to pivotally connect the frames 18 and 19 together.

The frame 20 includes two end plates 28 connected by horizontal bars 32 and 33 and supporting the rotary brush 30 at its ends, a segmental apron 34 being carried by the bars and extending about a portion of the brush. A horizontal plate 36 has two parallel arms 38 integral therewith at its ends and connected to the bar 32 at 40 and in like manner to the bar 33, the rear ends of the arms 38 together with a bracket 42 secured to one end of the frame 20 providing bearings for a shaft 44.

The frame 20 is secured to the frame 19 as follows. A worm gear 45 is secured by tap bolts 46 to the bottom face of the frame 19, the bolts extending through arcuate slots 48. The plate 36 of the frame 20 is secured by tap bolts 49 to the bottom face of the worm gear. A worm 50 on a shaft 52 rotatably mounted in the frame 19 is in mesh with the worm gear. A shaft 54 extends vertically through the frame 19 and plate 36 and centrally through the worm gear. It will be apparent that the frame 20 is thereby secured to the frame 19 and that the frame 20 can be angularly adjusted about the shaft 54 by rotating the worm.

The brush is adapted to be rotated from the engine 15 as follows. A sprocket 55 on the engine is connected by a chain 56 to a sprocket 57 on one end of the shaft 26. A chain 58 connects a sprocket 60 on the other end of the shaft 26 to a sprocket 61 on a shaft 62 carried by the frame 19. A bevel gear 64 on the shaft 62 is in mesh with a bevel gear 65 fixed to the top end of the vertical shaft 54 and like bevel gears 66 and 67 operatively connect the bottom end of the shaft 54 with the shaft 44. A chain 68 connects a sprocket 70 on one end of the brush with a sprocket 71 fixed to a sleeve 72 free on one end of the shaft 44, a clutch 74 splined to the shaft 44 being adapted to connect the sleeve to the shaft. The clutch is operated by a bell crank 75 connected by a rod 76 to one end of a hand lever 77 pivoted to the cross bar 78 of the tractor handles 16, a ratchet mechanism 80 being provided to hold the clutch in engagement.

A supporting caster 82 carried by and extending downwardly from the frame 18 is provided for taking the weight of the frames and brush. The weight of the brush and its supporting frame 20 is counter-balanced by a lever 83 fulcrumed at 84 on the frame 18 above the caster. A pair of springs 85 connect the forward end of the lever with the frame 20 over the brush and the rear end of the lever is provided with an adjusting screw 86 arranged to abut against a cross plate 87 of the frame 18. By adjusting the screw 86 more or less of the weight of the brush and frames can be placed on the caster. Two other casters 88 are provided on the frame 20 rearwardly of the brush and inwardly of its ends, these casters serving to limit downward movement of the brush and being located in such position that they do not interfere with the forward or endwise movement of the brush relative to curbing or other like obstacles.

When the tractor and unit are to be traveled without using the brush, the brush and frames can be lifted free of the ground and to such position that the weight thereof is taken by the caster 82 and the tractor wheels 12. The mechanism for effecting this function comprises an arm 90 pivoted to the shaft 26 and having its top end connected by a chain 91 to the frame 20 over the brush. A rod 92 extends rearwardly from the top end of the arm to a hand lever 93 pivoted to the cross bar 78. Rearward movement of the hand lever raises the brush and a ratchet 94 is provided for holding the same in the raised position. Except for the caster support at 82 the weight of the attachment would overload the tractor forwardly of the axle of wheels 12 as will be understood.

The worm 50 may also be conveniently rotated by a handle 96 located adjacent to the operator. The shaft carrying this handle is connected by sprockets and a chain 97 to a shaft 98 extending forwardly and having a universal joint connection 99 with the worm shaft 52.

It will now be apparent that I have produced a very compact and rugged sweeper unit which can be conveniently attached to a tractor and which is provided with compact and rugged gear connections permitting the brush to be easily adjusted to different angular positions for performing angular as well as straight sweeping. Attention is particularly called to the fact that the worm 50 normally holds the frame 20 against angular movement and permits it to be angularly adjusted merely by rotating the handle 96, and the simple shaft connection 98 from the worm can be applied to the tractor with great convenience. The load carrying caster 82 together with the brush counter-balancing means and the brush raising means provides efficient and effective mechanism for counter-balancing and traversing the brush, and the casters 88 which serve to limit downward movement of the brush are so located that they never interfere with movement of the brush into corners and close quarters. The frame comprising the attachment provides a compact and flexible connection for the brush, and the controls, including the clutch operating handle 77, are not only located most conveniently to the operator but can all be applied to the tractor with little effort and without substantially obstructing the tractor.

I claim:

1. A sweeper attachment for power driven tractors, comprising a frame adapted to be secured rigidly to the tractor and project forward horizontally therefrom, a second frame extending forwardly of the first frame and connected thereto for pivotal movement about a horizontal axis, a cylindrical brush forwardly of the second frame, a third frame supporting the brush at its ends for rotation on a horizontal axis, the third frame being connected to the second frame and movable therewith about the first-named axis, means supporting the third frame for adjustment horizontally about a vertical axis on the second frame, means for effecting such adjustment, and driving connections for rotating the brush from the tractor with the frames in their different positions of movement.

2. A sweeper attachment for power driven tractors, comprising a frame adapted to be secured rigidly to a tractor and project forward horizontally therefrom, a second frame extending forwardly of the first frame and connected thereto for pivotal movement about a horizontal axis, a horizontal cylindrical brush, means rotatably supporting the brush at and on the forward end of the second frame, means for rotating the brush, a supporting caster beneath and carried by the first frame forwardly of the tractor, means including a lever fulcrumed between its ends on the first frame above the caster and having resilient connection at its forward end with the brush-supporting means for counterbalancing the weight of the brush, and means cooperating with the rear end of the lever for adjusting the lever about its fulcrum to place the forward end in different positions of elevation whereby to raise the brush and place a substantial portion of its weight on the caster.

3. A sweeper attachment for power driven tractors, comprising means adapted to be secured rigidly to a tractor and project forward horizontally therefrom, a frame extending forwardly of said means and connected thereto for pivotal movement thereon about a horizontal axis, a cylindrical brush forwardly of the frame, a second frame supporting the brush at two ends for rotation on a horizontal axis, the second frame being connected to the first frame and freely movable up and down therewith about the first-named axis, a worm gear non-rotatably fixed in horizontal position to one of the frames, a worm fixed against longitudinal movement on the other frame and in mesh with the worm gear, rotation of the worm being adapted to rotatably adjust the second frame, and driving connections including a shaft extending centrally through the worm gear for rotating the brush from the tractor with the frames in their different positions of movement.

4. In combination with a two-wheel tractor of the type described embodying a body between and supported by two driving wheels which are in axial alignment, a frame secured rigidly to the tractor and projecting horizontally therefrom forwardly of and beyond the axis of the wheels, a second frame extending forwardly of the first frame and connected thereto for pivotal movement about a horizontal axis and adapted to carry a tool for working relative to the ground, a supporting caster beneath and carried by the first frame forwardly of the tractor, and means associated with the first frame and having connection with the second frame for raising the second frame about said horizontal axis whereby to place the weight thereof and mechanism carried thereby on the caster and tractor, the weight of the tractor and frames being so distributed on the driving wheel axis that the weight forwardly thereof substantially counterbalances the weight rearwardly thereof when the second frame is thus raised.

5. An attachment for a tractor embodying a body between and supported at its front portion by two wheels which are in axial alignment, comprising a frame adapted to be secured rigidly to the tractor and to project horizontally therefrom forwardly of and beyond the axis of the wheels, a second frame extending forwardly of the first frame and connected thereto for pivotal movement about a horizontal axis and adapted to carry a tool for working relative to the ground, a supporting caster beneath and carried by the first frame forwardly of the tractor, an arm pivoted to the first frame above the caster and extending upwardly and forwardly therefrom, means providing a conection from the outer end of the arm to the second frame forwardly of the horizontal axis, and means connected to the outer end of the arm and extending rearwardly whereby the arm can be pivoted rearwardly to raise the second frame and place the weight thereof and mechanism carried thereby on the caster and tractor.

6. An attachment for a tractor embodying a body between and supported at its front portion by two wheels which are in axial alignment, comprising a frame adaped to be secured rigidly to the tractor and to project horizontally therefrom forwardly of and beyond the axis of the wheels, a second frame extending forwardly of the first frame and connected thereto for pivotal movement about a horizontal axis and adapted to carry a tool for working relative to the ground, a supporting caster beneath and carried by the first frame forwardly of the tractor, an arm carried by the first frame above the caster and extending forwardly, means providing a resilient connection between the forward end of the arm and the second frame, and means cooperating with the arm for adjusting it vertically to place the forward end in different positions of elevation whereby to raise the second frame and place a substantial portion of it weight and the weight of mechanism carried thereby on the caster.

ROBERT E. BRADLEY.